Sept. 17, 1968 H. N. STAATS ET AL 3,401,439
LAMINATING APPARATUS
Filed May 19, 1965 2 Sheets-Sheet 1
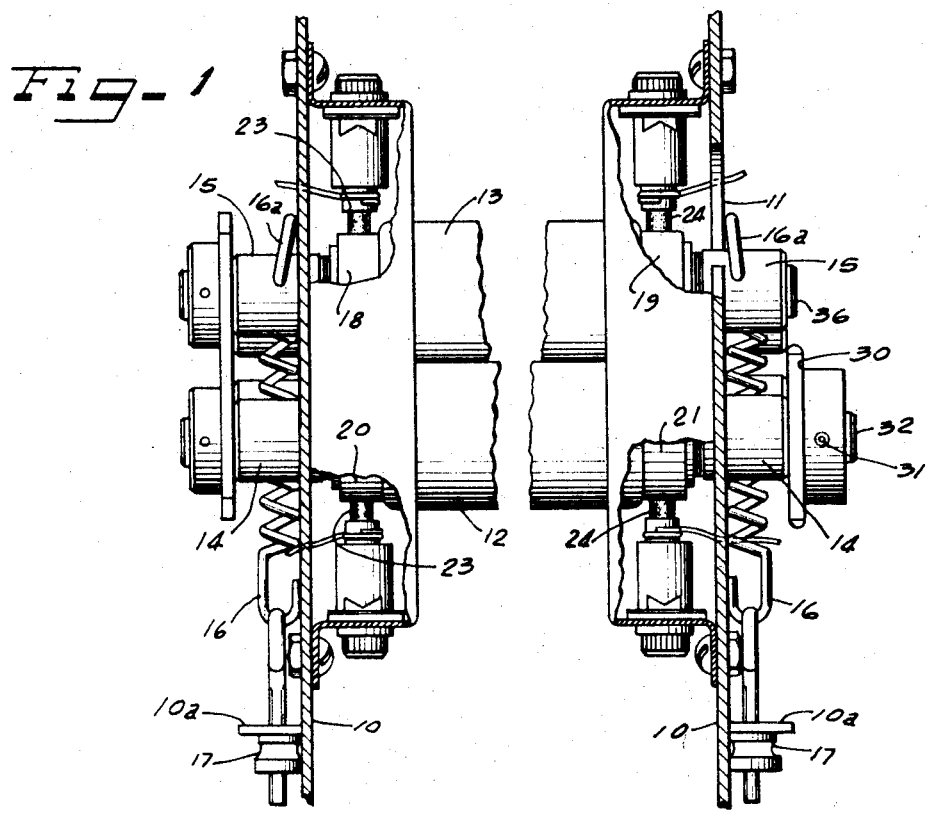
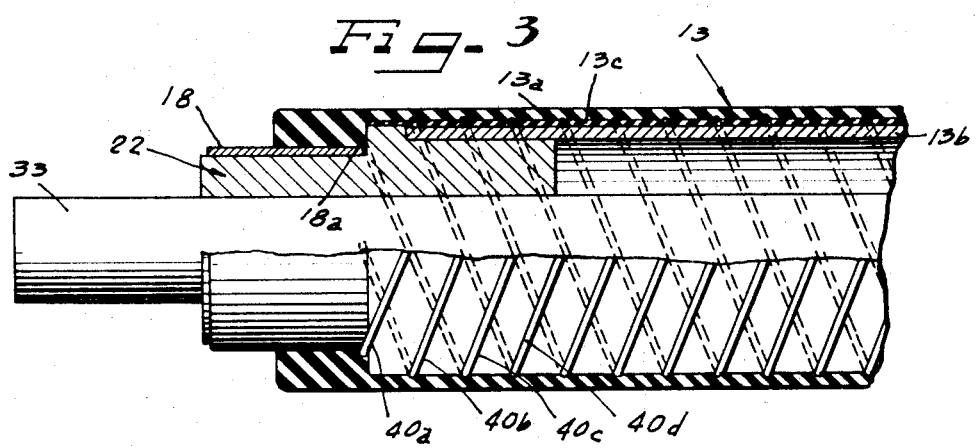
INVENTORS
HENRY N. STAATS
MAURICE D. LEVITAN
NEAL J. MORRISSEY
ATTORNEYS Sept. 17, 1968   H. N. STAATS ET AL   3,401,439
LAMINATING APPARATUS
Filed May 19, 1965   2 Sheets-Sheet 2
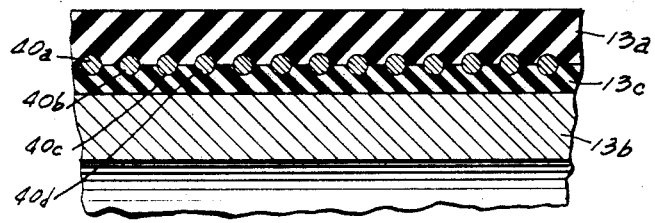
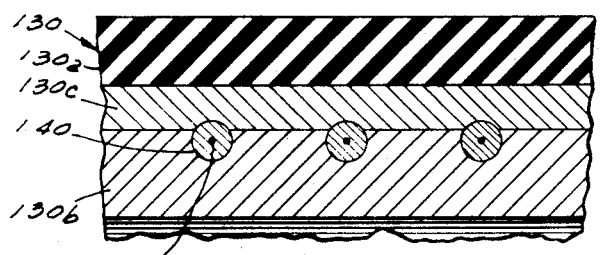
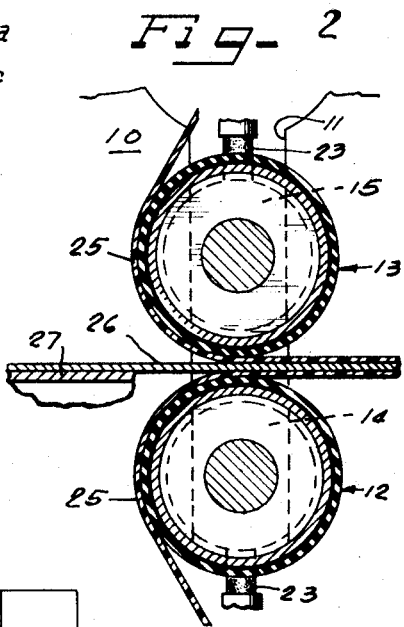
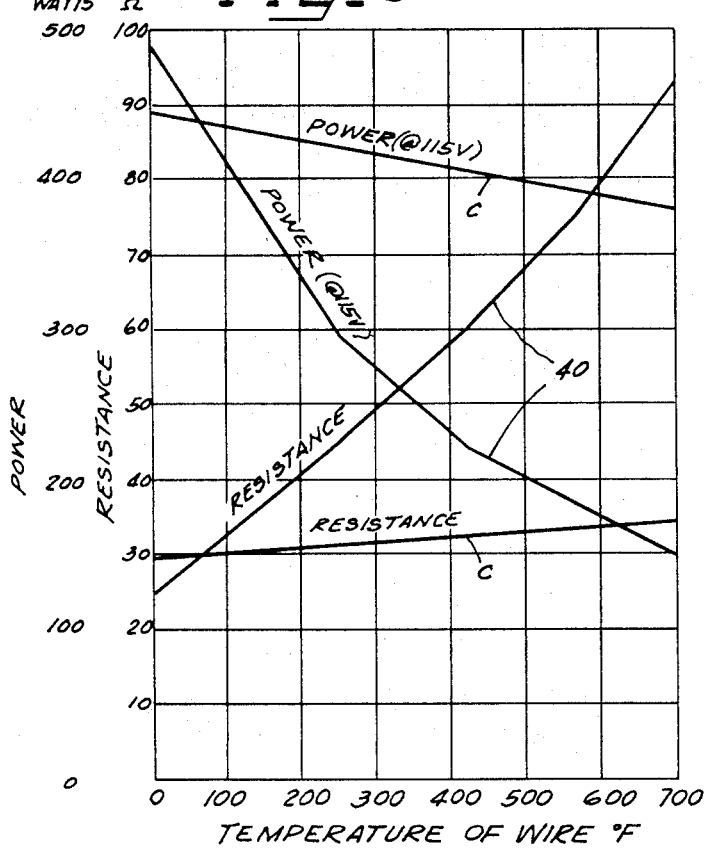
INVENTORS
HENRY N. STAATS
MAURICE D. LEVITAN
NEAL J. MORRISSEY
ATTORNEYS

United States Patent Office 3,401,439
Patented Sept. 17, 1968

3,401,439
LAMINATING APPARATUS
Henry N. Staats, Deerfield, Maurice D. Levitan, Wilmette, and Neal J. Morrissey, Chicago, Ill., assignors to General Binding Corporation, Northbrook, Ill., a corporation of Illinois
Filed May 19, 1965, Ser. No. 457,134
7 Claims. (Cl. 29—130)

ABSTRACT OF THE DISCLOSURE

A thin film laminating apparatus comprising a laminating roll having a resilient surface uniformly heated throughout by means of a helically-wound heating element therebeneath. The heating element is in close proximity to a highly heat conductive layer extending throughout the roll whereby the rapid dissipation of heat in a localized portion of the roll due to laminating procedures is substantially instantaneously accommodated and uniform heat is provided throughout the laminating surface at all times, and without hot spots.

---

The present invention relates to an improved apparatus for laminating thin films of plastic material to paper or the like. More particularly, the invention concerns the provision of improved laminator roll construction whereby greatly increased output is achieved compared to prior art devices and wherein thermal control is rendered far more accurate and consistent.

In recent years, much development work has been done in the field of laminating documents with a thin, transparent, protective film capable of adhering to such documents as paper upon the application of heat and pressure. One area of significant development in this field has been the utilization of the pressure rolls employed in such laminating apparatus as the heating element. For example, in United States Letters Patent No. 3,138,695 dated June 23, 1964, a laminating apparatus is described in which the pressure rollers of a laminating apparatus are made of an electrically conductive rubber having a sufficiently high resistance to provide a surface heated resilient roll. Devices of the type illustrated in that prior patent have proven satisfactory in many utilizations, but have proved to be extremely difficult to manufacture in large quantities with consistently uniform electrical and heating characteristics coupled with long life. Further, it has been found upon analysis of such machines in operation over periods of time that thermostatic controls employed in the system could not render sufficient control to prevent relatively wide variation in temperature over the length of the individual roll. Accordingly, it has been found difficult with such prior devices to provide extremely fast lamination speeds with uniformly high quality of output.

It is, accordingly, an important object of our invention to eliminate many of the difficulties encountered in the field in prior laminating roll configurations. Accordingly, and in accordance with the present invention, we have constructed a laminating apparatus employing a plurality of pressure rolls, which rolls are heated at the surfaces thereof for hot pressurized contact with a laminating film positioned over a document to be laminated. However, whereas prior constructions have employed electrically conductive resistance rubber elements or have provided longitudinally extending calrod type heaters positioned within the central core area of the rollers, our present invention embodies a highly heat conductive resilient roller utilizing a wire wound spiral electrical resistance element. A relatively thin cover of silicone rubber having heat conductive copper or similar metal impregnated therein is molded upon the outer surface of the roll covering the wire. This copper impregnated silicone rubber coating transmits the heat from the highly heatconductive core and helically wound resistance wire to the nip between the pressure rollers for transfer to the laminating film.

In constructing a preferred embodiment of the present invention, the heating element is formed of resistance wire having a substantially more rapid increase in internal electrical resistance with increased wire temperature than has been heretofore employed. This specific construction provides a limiting action on the system so that the resistance of the wire tends to regulate the thermal activity of the wire so that as the temperature of the wire goes up, the power consumed by the wire drops rapidly. This self-regulating action is highly beneficial and has substantially improved thermostat control functions of the laminating apparatus, particularly when coupled with a highly heat-conductive roll construction.

In further improving our laminating rolls, we have employed a highly thermally conductive material as a base upon which to mount the above-described increasing resistance heater wire. Chrome-plated steel rollers have long been used in the past for laminating pressure rolls. However, chrome-plated steel has a very low heat conductivity and heater elements positioned behind such surfaces, for the transmission of heat therethrough, provide uneven heating over the entire roll surface. This is manifested particularly under circumstances in which the rolls are in use, during a laminating operation. Under such circumstances, a portion of the roll surface is in direct contact with laminating materials. These laminating materials extract substantial amounts of heat from the roll surface with which they are in contact but the remaining surface of the roll remains at its high heat temperature. In such circumstances, a thermostat set to control the roll temperature at the point of laminating will call for substantial amounts of additional heat with the result that the portions of the roll not in contact with laminating materials become excessively hot. In the past, relatively high resistance roll materials have shown a decided tendency to cause uneven temperatures along the surface of the roll and resultant burn-out after relatively short life.

In accordance with our invention, we employ a roll material of very high heat conductivity. This roll is wound with the resistance heating wire and the exterior surface is then coated with a heat conductive silicone rubber material through which the heat must pass to the laminating materials. In operation, the presence of laminating material adjacent one area of the roll causes, as in prior art devices, a withdrawal of substantial amounts of heat from the roll. However, heat in the adjacent portions of the roll not in contact with the laminating materials is rapidly dissipated to the area from which the heat is withdrawn by the conductivity of the basic roll core. As a result, we have found that variation in roll temperature over the longitudinal length of the roll surface varies only minimally even during laminating operations. Accordingly, the useful life of the rolls has been multiplied by many times.

It is, accordingly, an object of our invention to provide a substantially improved laminating roll construction.

Another object of the present invention is to provide an improved laminating roll employing highly heat conductive resilient surface material.

Another object of the invention is to provide a pressure laminating roll having a highly heat conductive portion extending throughout the length thereof intimately coupled with an electrical resistance heating element.

Still a further object of the present invention is to provide a self-regulating heating roll for laminating apparatus wherein a highly conductive roll construction is provided with an electrical heating element of rapidly increasing resistance upon increasing temperature.

A feature of the invention is the utilization of a highly conductive metallic roll core having a highly conductive resilient coating therearound forming the laminating surface.

A further feature of the invention resides in the utilization of a metallic compound silicone rubber as a highly heat conductive roll surface.

Yet a further feature of the invention resides in the utilization of nonmetallic, electrically nonconductive heat insulating roller support bearings whereby heat rapidly conducted throughout the roll is isolated from the remainder of the roll supporting apparatus.

Still other and further objects and features of the invention will at once become apparent to those skilled in the art from a consideration of the attached specification and drawings wherein preferred embodiments of the invention are shown by way of illustration only, and wherein:

FIGURE 1 is an end elevational view, partially broken away, of a pair of laminating rolls arranged for the lamination of thin films to paper stock or the like;

FIGURE 2 is a side elevational view of the rolls illustrated in FIGURE 1 schematically illustrating their use in lamination procedures;

FIGURE 3 is a longitudinally taken cross-sectional view of a laminating roll constructed in accordance with the principles of the present invention;

FIGURE 4 is an enlarged view of a small portion of a roll similar to FIGURE 3;

FIGURE 5 is a cross-sectional view, somewhat enlarged, of a roll configuration of a modified form, and FIGURE 6 is a chart illustrating the resistance characteristics of a preferred form of heating wire employed in accordance with the present invention.

As shown on the drawings:

As may be seen from a consideration of FIGURE 1, the laminating rolls of the present invention may be employed in apparatus generally similar in construction to the laminating apparatus of United States Patent No. 3,138,695. As shown in FIGURE 1, the laminating device embodies a pair of side support plates 10 having opposed vertically extending slots 11 carrying a pair of laminating rolls 12 and 13 by way of projecting end bearing blocks 14 and 15 respectively. In the embodiment illustrated, the bearing box 14 of the lower roll 12 are rigidly supported from below while the bearing blocks 15 are slidably arranged and spring biased downwardly toward the blocks 14 by way of springs 16 entrained about the upper surface of the blocks 15, as at 16a, and adjustably secured to the plates 10 at 17. The threaded adjusting nuts 17, reacting against tanks 10a struck up from the plates 10 permit the application of a strong biasing force tending to urge roll 13 downwardly snugly against roll 12. The rolls are heated by the application of electrical current at the outboard ends of the conductive portions thereof. Thus, roll 13 is provided with left-hand commutator ring 18 and right-hand commutator ring 19 while roll 12 is provided with similar respective rings 20 and 21. The commutator rings 18 through 21 are mounted on dielectric bushings 22 illustrated clearly in FIGURE 3 and are electrically in contact with a source of electrical current introduced to the rolls by way of brushes 23. Electricity entering the rolls at the left-hand side by way of commutator rings 18 and 20 leaves the laminating apparatus by way of commutator rings 19 and 21, and output brushes 24.

In operation, the rolls are supplied with thermoplastic laminate, for example, a thin laminated sheet of Mylar bonded to polyethylene, with the polyethylene surface positioned relative to the rolls such that the Mylar contacts the rolls and the polyethylene is positioned for contact with the substance being laminated. Such a film is illustrated at 25 in FIGURE 2 where it is illustrated as being fed over rolls 12 and 13 for the application of heat and pressure to laminate a paper product or the like indicated at 26 entering the nip between the rolls 12 and 13 by way of a loading platform 27. In the apparatus illustrated, the laminating materials are fed through the pressure rollers by the application of rotational torque to the rolls via a sprocket 30 drivingly secured to the lower roll shaft 32 by way of set screw 31 or the like. Shaft 33 of the upper roll 13 may similarly be driven, although in the illustration shown, the upper roll derives its power through its frictional contact with the lower roll and the lamination product.

The individual rolls constructed in accordance with the present invention may take several related forms. In the first embodiment illustrated, shown clearly in FIGURE 3, the exterior surface 13a of the roll 13 is composed of a thermally conductive rubber or the like. An example of the material that has been successfully employed is a silicone rubber material composed of 67% G.E. Se 452 rubber compound carrying, blended therewith, 33% by weight of copper. The roll 13 has a main supporting core of cylindrical construction indicated at 13b. The core 13b is constructed of aluminum which has a very high conductivity. However, it will be understood that materials of even higher heat conductivity, such as, for example, copper, may be employed where cost is a relatively unimportant factor. The core 13b is wrapped with a layer of silicone rubber tape or the like for a narrow thickness on the order of .020 inch, as indicated at 13c, and the heating resistance wire is wound thereon in four parallel helices as indicated at 40a, 40b, 40c and 40d.

In an example which has proven highly effective, the wire comprised a resistance wire of a resistance $R=3.124$ ohms per foot at 68° F. This wire comprised 87 turns for each of the four separate circuits, the wire being of 34 gauge or .0063 inch diameter. Employing a roll having an outside diameter of approximately 1⅜″, this provided an over-all resistance in the electrical circuit of 23 ohms at 68° F. The individual wires 40a, 40b, 40c and 40d are each silver-soldered or otherwise similarly connected to the commutator rings 18 and 19, as for example at 18a, as shown in FIGURE 3. This provides an electrically conductive circuit through the roll immediately under the conductive rubber surface thereof. Temperature variations in the roll are minimized by the highly conductive supporting layer 13b which readily transfers heat from one spot on the roll to others, should there be a heat drain of substantial proportions during a laminating period.

The electrical characteristics of the wire employed in accordance with the present invention are substantially different from those of the ordinary nickel-chrome-iron heating wire. This may be shown readily in the form of a chart, as in FIGURE 6. There, the wire 40 is characterized by a power curve which drops from a value of approximately 500 watts at 0° F. wire temperature down to approximately 150 watts at 700° F. wire temperature with a resistance that varies from approximately 25 ohms at 0° F. temperature to approximately 95 ohms at 700° F. wire temperature. This provides a pair of curves that cross in the range of roll temperatures and have a tendency to stabilize adjacent the intersection at a temperature of approximately 350° F. in a self-regulating manner. The curves 40 illustrated in FIGURE 6 comprise an illustration of a successfully employed wire having a 70% nickel and 30% iron analysis.

On the other hand, conventional nickel-chrome-iron wire provides converging power and resistance curves shown at C in which only slightly varying power and resistance are provided over the range of 0° F. to 700° F. wire temperature. The self-regulating characteristic of the wire employed in accordance with the present invention has provided, particularly in combination with the high conductivity of the roll surface, very superior thermostatic control capability.

Alternate embodiments of the invention may be seen in FIGURES 4 and 5. In FIGURE 4, the construction is substantially identical to that described above with respect to FIGURE 3, except that the wires 40a, 40b, 40c and 40d are more densely wound to provide a greater heat delivery. In practice, this permits faster laminating speeds. In some installation, the density may vary over the length of the roll. For example, a narrow (four inches) width of dense winding at the center of the rolls may be augmented by a wider spaced wire over the remainder of the roll to permit exceptionally high speeds where narrow film is employed while at the same time wider materials may be employed at normal or more conservative speeds.

In the embodiment illustrated in FIGURE 5, the core 130b of the roll generally indicated at 130 is constructed of helically grooved metal. In practice, this is preferably highly heat conductive, such as for example, copper or aluminum. It may, for reasons advanced below, however, be constructed of a substantially stronger material such as steel, which has relatively low heat conductivity. Armored wire 140 is wound in the helical grooves 130d. This wire has the heating element therein electrically isolated from the outside surface thereof by a dielectric material of conventional form. This armored wire, after having been wound in the helical groove 130d is bonded to the surrounding support 130b by electro-depositing a highly conductive material such as copper in the form of a layer 130c. This highly conductive and intimately bonded layer 130c provides extremely rapid heat dissipation from the armored wire 140. Thus, even though the interior core 130b may be somewhat low in heat conductivity, the layer 130c provides very high conductivity immediately under the relatively highly heat conductive resilient roll surface material 130a. In the embodiments of FIGURES 4 and 5, the resilient surface material is the same as that in connection with the embodiment of FIGURE 3.

It will thus be observed that we have provided a novel arrangement in which the laminating rolls are constructed of a highly heat conductive material having extremely rapid heat dissipation characteristics which provides substantial heat uniformity throughout the roll both at its surface and at its substrata. Additionally, by employing wire of the characteristics described, in which the resistance and power curves intersect in the range of temperature employed in normal system usage, a much more stable, self-regulating heating roll is provided. As a result of these arrangements, life tests have shown satisfactory operation over many hundreds of hours of use where prior resilient heating roll constructions have failed at consistently much shorter lifetimes.

It will, of course, be apparent to those skilled in the art that variations and modifications may be made in the structures above described, without departing from the novel concepts thereof. It is, accordingly, our intent that the scope of the present invention be limited solely by that of the hereinafter appended claims.

We claim as our invention:

1. A laminating roll for laminating thermoplastic film or the like, comprising a rigid cylindrical core, an electrical resistance wire heating element helically wound around said core, and a first outer resilient surface layer having relatively high heat conduction properties supplied thereover, said roll having at least one highly heat conductive cylindrical layer in close physical proximity to said heating element and to said surface layer throughout the laminating length of the roll, said highly conductive cylindrical layer having a heat conductivity equivalent to that of aluminum or greater.

2. A laminating roll construction in accordance with the provisions of claim 1 wherein said resilient surface layer comprises a bonded silicone rubber having highly heat conductive material interspersed therethrough.

3. The laminating rool as set forth in claim 2 wherein said interspersed material is copper.

4. A laminating roll construction in accordance with claim 1 wherein said layer of high heat conductivity is in direct heat conducting contact with said heating element.

5. A laminating roll for laminating thermoplastic film or the like, comprising a rigid cylindrical core, an electrical resistance wire heating element helically wound around said core, and a resilient relatively highly heat conductive surface layer supplied thereover, said roll having at least one highly heat conductive cylindrical layer, said wire-heating element comprising a wire having a very high increase in electrical resistance with increase in wire temperature.

6. A laminating roll for laminating thermoplastic film or the like, comprising a rigid cylindrical core, an electrical resistance wire heating element helically wound around said core, and a first outer resilient surface layer having high heat conductive properties supplied thereover, said roll having at least one highly heat conductive cylindrical layer is close physical proximity to said heating element and to said surface layer throughout the laminating length of the roll, said wire heating element comprising a wire having a very high increase in electrical resistance with increase in wire temperature, providing intersecting power and resistance curves over the range of normal wire operation temperatures.

7. A laminating roll for laminating thermoplastic film or the like, comprising a rigid cylindrical core, an electrical resistance wire heating element helically wound around said core, and a relatively thin resilient surface layer supplied thereover, said roll having at least one cylindrical layer thereof constructed of a highly heat-conductive material, said rigid core being a material helically grooved for said wire and said wire being electrically insulated from said core, and said cylindrical layer comprising a layer of highly conductive material bonding said wire to said core.

References Cited

UNITED STATES PATENTS

| | | | |
|---|---|---|---|
| 1,271,577 | 7/1918 | Jeannetaud | 219—244 X |
| 1,461,252 | 7/1923 | Moyle | 100—93 |
| 1,974,302 | 9/1934 | Finlayson | 219—504 X |
| 2,339,492 | 1/1944 | Lewis | 100—93 |
| 2,357,845 | 9/1944 | Nordquist | 219—469 X |
| 2,799,793 | 7/1957 | De Cain | 165—180 X |
| 2,912,556 | 11/1959 | Hold | 165—89 X |
| 3,138,695 | 6/1964 | Bracich | 219—244 |
| 3,278,723 | 10/1966 | Van Toorn | 219—470 |

LOUIS O. MAASSEL, *Primary Examiner.*